(12) United States Patent
Lam et al.

(10) Patent No.: US 10,443,778 B2
(45) Date of Patent: Oct. 15, 2019

(54) BALANCING STRUCTURES

(71) Applicant: HEWLETT-PACKARD DEVELOPMENT COMPANY, L.P., Houston, TX (US)

(72) Inventors: Chern Shi Lam, Taipei (TW); Jui-Ming Chien, Taipei (TW); Hai-Lung Hung, Taipei (TW); Yu Jen Liu, Taipei (TW); Cary Hung, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/748,966

(22) PCT Filed: Aug. 21, 2015

(86) PCT No.: PCT/CN2015/087780
§ 371 (c)(1),
(2) Date: Jan. 30, 2018

(87) PCT Pub. No.: WO2017/031626
PCT Pub. Date: Mar. 2, 2017

(65) Prior Publication Data
US 2019/0003633 A1    Jan. 3, 2019

(51) Int. Cl.
*F16M 11/10*    (2006.01)
*F16M 11/20*    (2006.01)
*F16M 11/42*    (2006.01)
*G06F 1/16*    (2006.01)
*G06F 1/26*    (2006.01)

(52) U.S. Cl.
CPC ......... *F16M 11/10* (2013.01); *F16M 11/2021* (2013.01); *F16M 11/42* (2013.01); *G06F 1/16* (2013.01); *G06F 1/26* (2013.01)

(58) Field of Classification Search
CPC .... F16M 11/10; F16M 11/42; F16M 11/2021; G06F 1/16; G06F 1/26
USPC ................. 248/917–924, 127, 371, 129, 424
See application file for complete search history.

(56) References Cited

U.S. PATENT DOCUMENTS

| | | | | |
|---|---|---|---|---|
| 3,789,140 A * | 1/1974 | McQueen | .............. | H04N 5/655 248/685 |
| 5,947,440 A | 9/1999 | Cho | | |
| 6,134,103 A | 10/2000 | Ghanma | | |
| 6,227,518 B1 | 5/2001 | Sun | | |
| 6,409,128 B1 * | 6/2002 | Deshler | ............... | B05B 13/0285 248/125.1 |
| 6,560,093 B1 * | 5/2003 | McLeod | ................... | G06F 1/16 312/223.2 |

(Continued)

FOREIGN PATENT DOCUMENTS

| | | |
|---|---|---|
| CN | 202812693 U | 3/2013 |
| CN | 103582855 A | 2/2014 |

(Continued)

*Primary Examiner* — Muhammad Ijaz
(74) *Attorney, Agent, or Firm* — HPI Patent Department (57) ABSTRACT

An example balancing structure includes a stand and a balancing structure. The stand is to support the object to stand on a plane, and adjust a position of the object. The balancing structure is installed on a base of the stand and is to balance a tipping force of the base suffered from an adjustment of the position of the object.

11 Claims, 7 Drawing Sheets

(56) References Cited

U.S. PATENT DOCUMENTS

| | | | |
|---|---|---|---|
| 6,734,922 B1* | 5/2004 | Seo | F16M 11/041 |
| | | | 248/371 |
| 7,784,758 B2 | 8/2010 | Oh et al. | |
| 8,235,342 B2 | 8/2012 | Pfister et al. | |
| 8,648,821 B2 | 2/2014 | Wu et al. | |
| 2008/0116346 A1* | 5/2008 | McCarthy | B25H 3/06 |
| | | | 248/424 |
| 2008/0237412 A1* | 10/2008 | Chinuki | F16M 11/10 |
| | | | 248/123.2 |

FOREIGN PATENT DOCUMENTS

| | | |
|---|---|---|
| CN | 103616930 A | 3/2014 |
| CN | 203911528 U | 10/2014 |
| EP | 1388704 A | 2/2004 |
| JP | 2014106487 A | 6/2014 |
| TW | M381438 | 6/2010 |
| TW | M474936 | 3/2014 |

\* cited by examiner

BALANCING STRUCTURES

BACKGROUND

In some applications, an object may be placed on a structure, with the help of the structure to adjust a position of the object. In an example, it is feasible to adjust a height of the object via the structure, such as to increase or reduce the height of the object. In another example, a tilt angle of the object may be adjusted via the structure, such as to tilt the object forward or back to an upright position to provide easy interaction with the object for users. The object may be an electronic device, such as an All-in-One (AiO) panel, a tablet, a Point of Sales (POS), a display, etc. The object may be other devices suitable to be placed on the structure.

BRIEF DESCRIPTION OF THE DRAWINGS

For a better understanding of the present disclosure, reference should be made to the Detailed Description below, in conjunction with the following drawings in which like reference numerals refer to corresponding parts throughout the figures.

DETAILED DESCRIPTION

When adjusting the structure to change the position of the object, a base of the structure may not securely attached to a plane for placing the structure due to a tipping force suffered from the adjustment of the structure. For example, the base may lift when a user tries to tilt a clamping part (such as a cradle) of the structure to change a tilt angle of the object, or when a user lifts an arm (such as a folding telescopic arm) of the structure to alter the height of the object. Accordingly, the object may tip due to the unsteady of the base during position adjustment.

In order to fight against the tipping force of the base suffered from the adjustment of the position of the object, a balancing structure may be mounted on the structure for placing the object, to balance the tipping force. In an example, the position of the object may refer to such as a height or a tilt angle of the object. In an example, the balancing structure may be a structure like crank. In an example, the balancing structure may include a crank balance part for providing a downward force, and a crank body for providing an eccentric arm of force for the downward force, so that a torque generated by the downward force and the eccentric arm of force may counteract the tipping force of the base suffered from the adjustment of the position of the object.

In an example, the downward force may include a gravity of the crank balance part. The downward force may further include an additional force applied by an external force, such as a pulling force provided by a spring, to the crank balance part.

FIGS. 1A to 1G are schematic diagrams illustrating a structure for placing an object according to examples of the present disclosure.

As shown in FIGS. 1A to 1G, the structure may include a stand 1 and a balancing structure 2.

In an example, the stand 1 may support the object 3 to stand on a plane, such as, a countertop or a desktop. The stand 1 may include a base 11, an arm 12 and a clamping part 13.

The clamping part 13 may clamp and support the object 3. In an example, the object 3 may be an electronic device, or other types of devices having requirements for adjusting positions.

In an example, the base 11 may be placed on the plane, serving as a pedestal of the stand 1. In an example, the base 11 may be an ordinary base. In another example, the stand 1 may be a docking station for an electronic device, and the base 11 may be a power supply base for providing power supply for charging the electronic device.

The arm 12 may includes first end 121 and a second end 122. The first end 121 of the arm 12 is connected with the base 11, and the second end 122 of the arm 12 is connected with the clamping part 13. In this way, the height of the clamping part 13 may be adjusted by lifting or fording the arm 12. In an example, the arm 12 may rotate around a connection point between the first end 121 of the arm 12 and the base 11, and the clamping part 13 may rotate around a connection point between the second end 122 of the arm 12 and the clamping part 13. With the help of the connection mechanism as shown in FIGS. 1A to 1G, the position of the object may be adjusted. In an example, by adjusting the angle $\alpha$ between the arm 12 and the base 11, the height of the object or the clamping part 13 may be adjusted. In an example, by adjusting the tilt angle of the clamping part 13, the tilt angle of the object may be adjusted accordingly. In an example, the arm 12 may be a telescopic arm, by adjusting the length of the arm, the height of the object or the clamping part 13 may be adjusted.

In an example, the balancing structure 2 may be installed on the base 11, to balance a tipping force of the base 11 suffered from an adjustment of the position of the object 3.

The installation position of the balancing structure 2 may be designed according to force bearing status of the base 11. For example, when it is found out after testing that the adjustment of the position of the object 3 mainly generates the tipping force on a rear part of the base 11, the balancing structure 2 may be located at the rear of the base 11, to give a balance to the tipping force. In an example, the balancing structure 2 may be installed on the back side or installed on the bottom rear of the base 11. In an example, when it is found out after testing that the adjustment of the position of the object 3 mainly generates the tipping force on a front part of the base 11, the balancing structure 2 may be located at the front of the base 11. In an example, the balancing structure 2 may be installed on the front side or installed on the bottom front of the base 11. In an example, both the rear part and the front part of the base 11 may install a balancing structure 2. When the balancing structure 2 is installed on the bottom of the base 11, the balancing structure 2 may be covered by the housing (which is not shown in the figures) of the base 11, and not be exposed to the outside to provide a neat appearance for the stand 1.

Figure 1A:
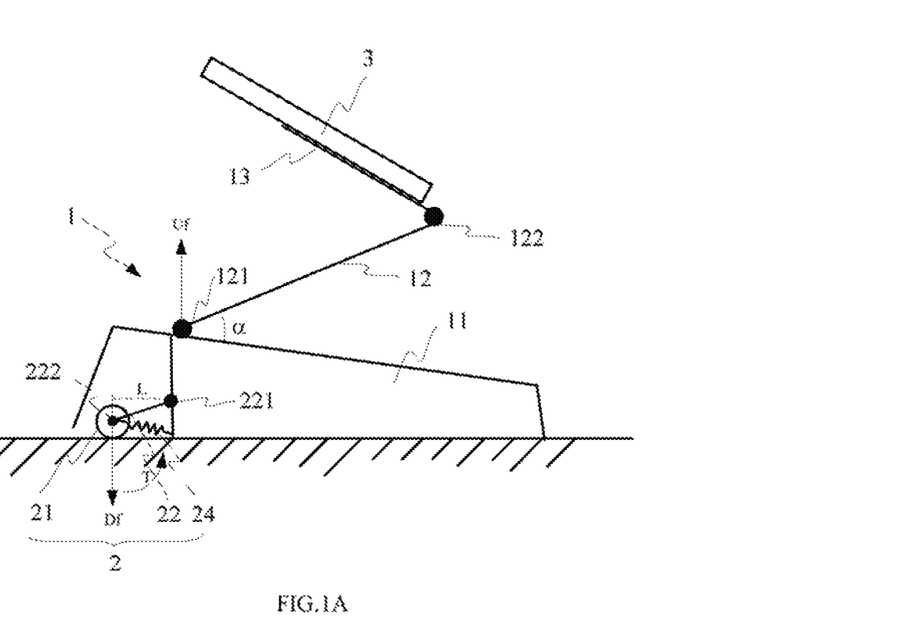
FIGS. 1A to 1G are schematic diagrams illustrating a structure for placing an object according to examples of the present disclosure.
Figure 1B:
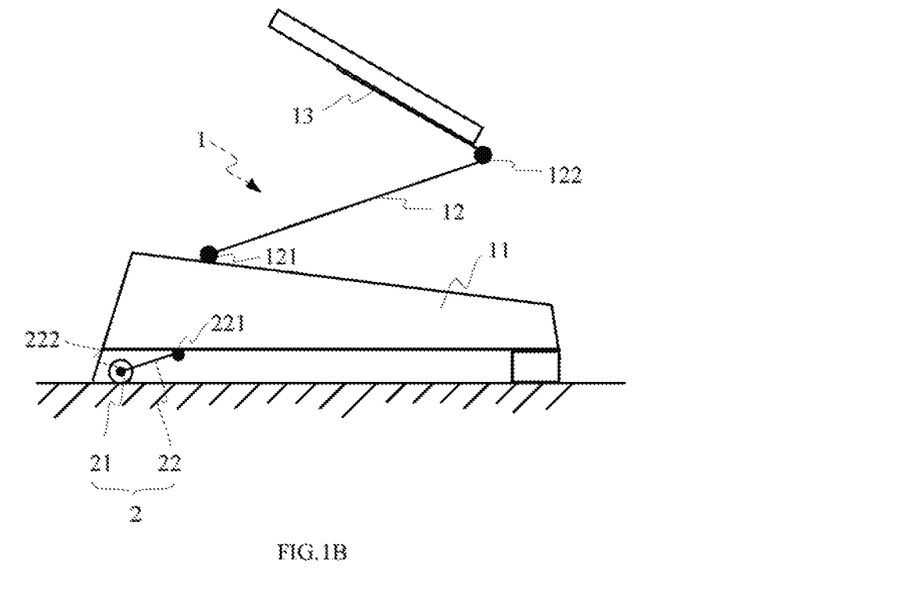

FIGS. 1A and 1B show an installation position of the balancing structure 2 on the rear part of the base 11, respectively, in accordance with examples of the present disclosure. In an example, it is the rear part of the base 11 that receives the tipping force ("Uf") due to the adjustment of the position of the object 3. In an example, the balancing structure 2 may be installed on the back side of the base 11, as shown in FIG. 1A. In an example, the balancing structure 2 may be installed on the bottom rear of the base 11, as shown in FIG. 1B.

In an example, the balancing structure 2 may include a crank balance part 21 and a crank body 22, as shown in FIGS. 1A and 1B. The crank balance part 21 may provide a downward force ("Df"), which may include the gravity of the crank balance part 21. The crank body 22 may include a first end 221 and a second end 222. The first end 221 of the crank body 22 is connected to the base 11 to enable the crank body 22 to rotate around a connection point between the first end 221 and the base 11. The second end 222 of the crank body 22 is connected to the crank balance part 21, and the crank balance part 21 may rotate around the connection point between the crank balance part 21 and the crank body 22. Thus, the crank body 22 may provide an arm of force L for the downward force Df, and a torque T produced by tire downward force Df generated by the crank balance part 21 and the arm of force L generated by the crank body 22 may be against the tipping force of the base suffered from the adjustment of the position of the object. In an example, the torque T may be a product of the downward force Df and the eccentric arm of force L. That is, to multiply the downward force Df by the eccentric arm of force L may obtain the torque T. By adjusting the mass of the crank balance part 21 and/or the length of the arm of force of crank body 22, the value of the torque T may be adjusted.

Figure 1C:
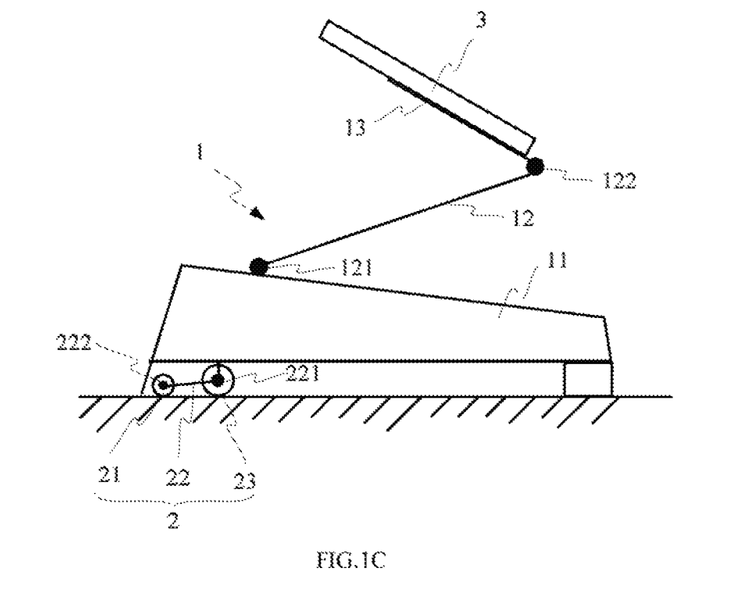
Figure 1D:
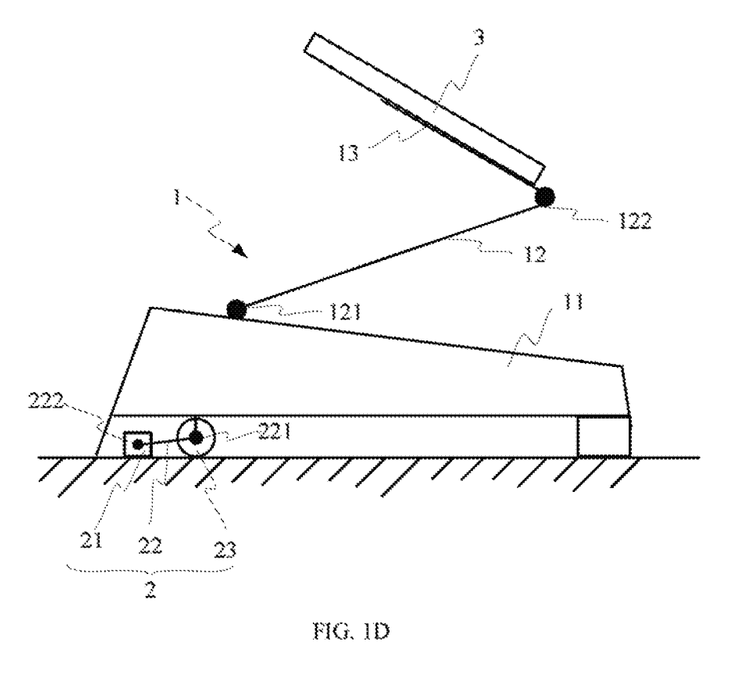

In another example, the balancing structure 2 may further include a wheel 23, as shown in FIGS. 1C and 1D. That is to say, the balancing structure 2 may include a crank balance part 21, a crank body 22 and a wheel 23. Namely, compared to FIGS. 1A and 1B, the balancing structure 2 shown in FIGS. 1C and 1D further includes a wheel 23. The wheel 23 is connected to the base 11 and can rotate about an axis of the wheel 23. In the example, the first end 221 of the crank body 21 is coaxial with the wheel 23. That is, the wheel 23 is coaxially connected with the first end 221 of the crank body 22, and to enable the base 11 to move on the plane. When the crank balance part 21 is rotated up to leave the plane, the structure can move to different positions. Namely, with the wheel 23, the smooth moving of the object 3 may be achieved.

In another example, the balancing structure 2 may further include an elastic element 24, as shown in FIG. 1A. The elastic element 24 includes a first end and a second end. The first end of the elastic element 24 is connected to the base 11, and the second end of the elastic element 24 is connected to the second end 222 of the crank body 22. The elastic element 24 may apply a constant braking force (namely a downward pulling force) to the crank balance part 21, and then the crank balance part 21 may introduce an additional downward force. That is, the downward force Df may further include an additional downward force besides the gravity of the crank balance part 21. By adjusting the elasticity of the elastic element 24, the value of the torque T may be adjusted.

The elastic element 24 may be a torsional spring, a compressed spring, shrapnel, a coil spring, or the like.

In examples of the present disclosure, the shape of the crank balance part 21 is not limited. In an example, the crank balance part 21 may be a balancing wheel, namely a small wheel, as shown in FIGS. 1A to 1C. In another example, the crank balance part 21 may be a balancing block, as shown in FIG. 1D. In other examples, the crank balance part 21 may be other shapes. When the crank balance part is a balancing wheel, the appearance of the plane (such as the countertop or the desktop) will not be scratched due to the surface of the wheel is smooth and without edges and corners.

In order to increase the force for attaching to the plane of the base of the structure, in an example, the crank balance part 21 may be covered by materials having preset friction coefficient, so that the force of the friction of the crank balance part 21 may be increased. The materials having preset friction coefficient may be rubber, silicone, and so on. In another example, the crank balance part 21 may be provided with a textured surface.

In addition, the shape of the crank body 22 is also not limited in examples of the present disclosure. For example, it may be straight or curved.

There are many connection methods between the wheel 23 and the base 11, two of them will be described hereinafter.

Figure 1E:
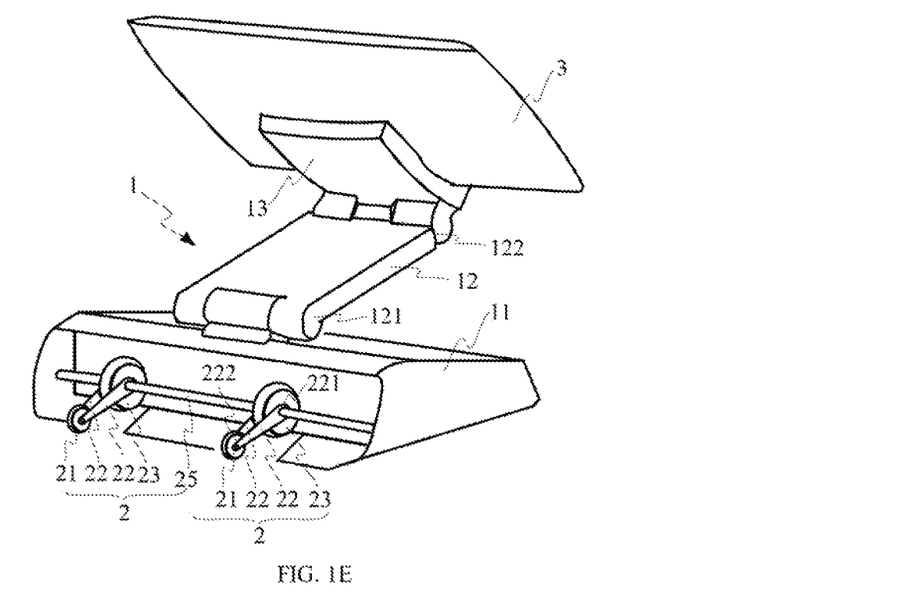
Figure 1F:
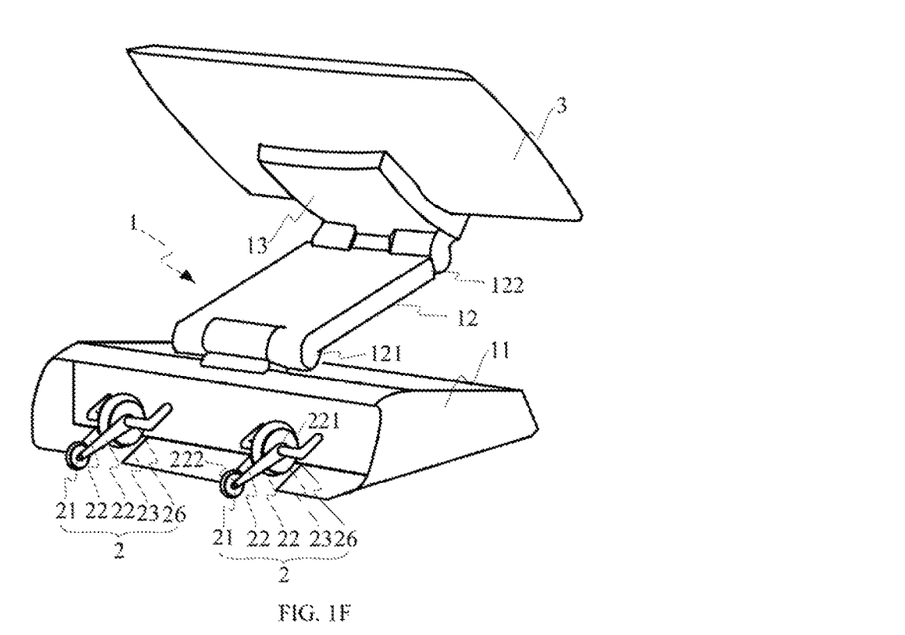
Figure 1G:
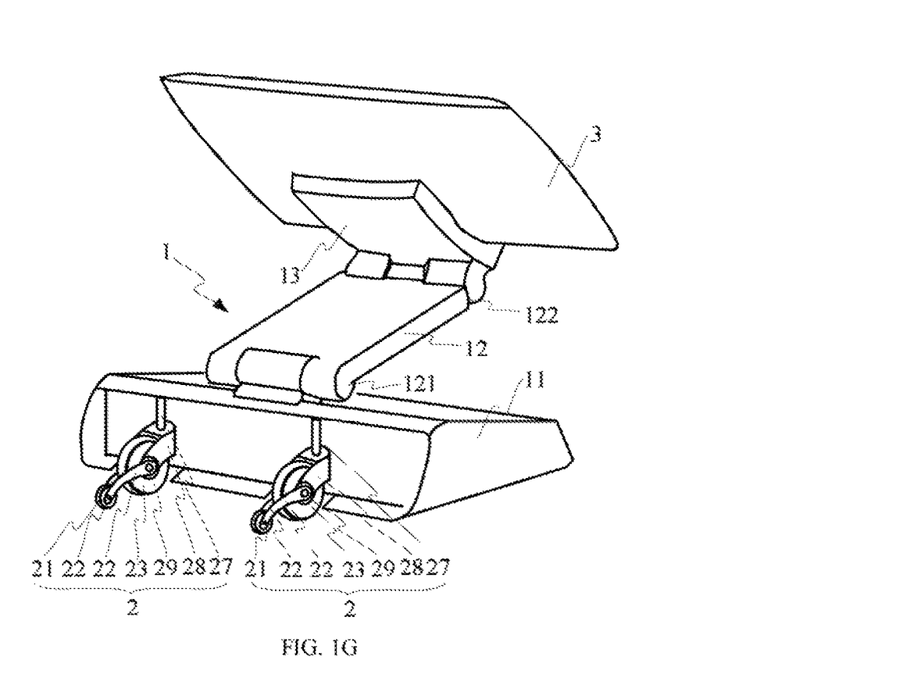

FIGS. 1E to 1G respectively shows a perspective view of a structure for placing an object when the balancing structure 2 is installed on the back side of the base 11. As shown in FIGS. 1E and 1F, there are two set of balancing structure 2, and each set of balancing structure 2 includes a crank balance part 21, a crank body 22, a wheel 23 and a connection shaft. Namely, compared to FIGS. 1C and 1D, the balancing structure 2 shown in FIGS. 1E and 1F further includes a connection shaft. The connection shaft is horizontally mounted on the base 11, and to serve as an axle of the wheel 23 for bearing rotation of the wheel 23. That is, the wheel 23 may be mounted on the connection shaft and may revolve about an axis of the connection shaft. The connection shaft may be a long shaft 25, and both of two wheels 23 are mounted on the connection shaft 25. Alternatively, the connection shaft may also be a short shaft 26, and one wheel 23 is mounted on one connection shaft 26. Based on the connection structure of the wheel 23 shown in FIGS. 1E and 1F, the moving direction of the wheel 23 is fixed.

In addition, the connection relationship of the crank balance part 21 and a crank body 22 are similar to FIGS. 1C and 1D. In FIGS. 1E and 1F, there are two crank bodies 22, and each crank body 22 includes a first end 221 and a second end 222. The first ends 221 of the two crank bodies 22 are connected to the connection shaft, and the crank bodies 22 can rotate around the axis of the connection shaft. The second ends 222 of the crank bodies 22 are connected with the crank balance part 21, and the crank balance part 21 may rotate about the connection point between the crank balance part 21 and the crank bodies 22.

As shown in FIG. 1G, there are also two set of balancing structure 2, and each set of balancing structure 2 includes a crank balance part 21, a crank body 22, a wheel 23, a first shaft 27, a fork 28 and a second shaft 29. Namely, compared to FIGS. 1C and 1D, the balancing structure 2 shown in FIG. 1G further includes a first shaft 27, a fork 28 and a second shaft 29. The first shaft 27 is mounted on the base 11 in a first direction, such as the vertical direction; the fork 28 is connected with the first shaft and capable of revolving around an axis of the first shaft. The second shaft 29 is mounted on the fork 28 in a second direction, such as the horizontal direction, and to serve as an axle of the wheel 23 for bearing rotation of the wheel 23. The second direction is vertical with the first direction. The wheel 23 may be mounted on the second shaft 29 and can revolve about an axis of the second shaft 29. Based on the connection structure of the wheel 23 shown in FIG. 1G, the wheel 23 can achieve Omni-directional moving, namely, the connection structure of the wheel 23 is an Omni-directional wheel structure, also called universal wheel structure.

In addition, the connection relationship of the crank balance part 21 and a crank body 22 are similar to FIGS. 1C and 1D. In FIG. 1G, there are two crank bodies 22, and each crank body 22 includes a first end 221 and a second end 222. The first ends 221 of the two crank bodies 22 are connected to the second shaft 29, and the crank bodies 22 can rotate around the axis of the second shaft 29. The second ends 222 of the crank bodies 22 are connected with the crank balance part 21, and the crank balance part 21 may rotate about the connection point between the crank balance part 21 and the crank bodies 22.

In other examples, the number of balancing structure 2 may be one, three, four, and so on, and it is not limited by examples of the present disclosure.

In each balancing structure 2, the number of crank bodies 22 may be one, two, and so on, and it is not limited by examples of the present disclosure. In each balancing structure 2, the number of crank balance parts 21 may be one, two, and so on, and it is not limited by examples of the present disclosure. In each balancing structure 2, the number of wheels 23 may be one, two, and so on, and it is not limited by examples of the present disclosure.

Figure 2A:
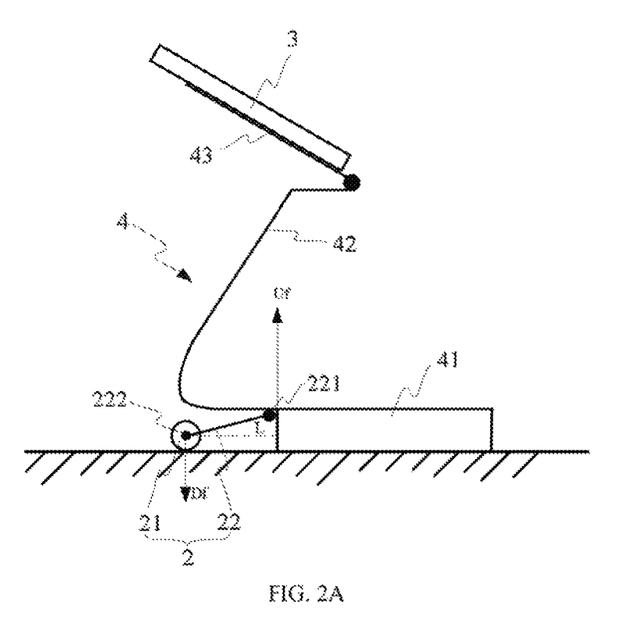
FIGS. 2A to 2C are schematic diagrams illustrating a structure for placing an object according to examples of the present disclosure.
Figure 2B:
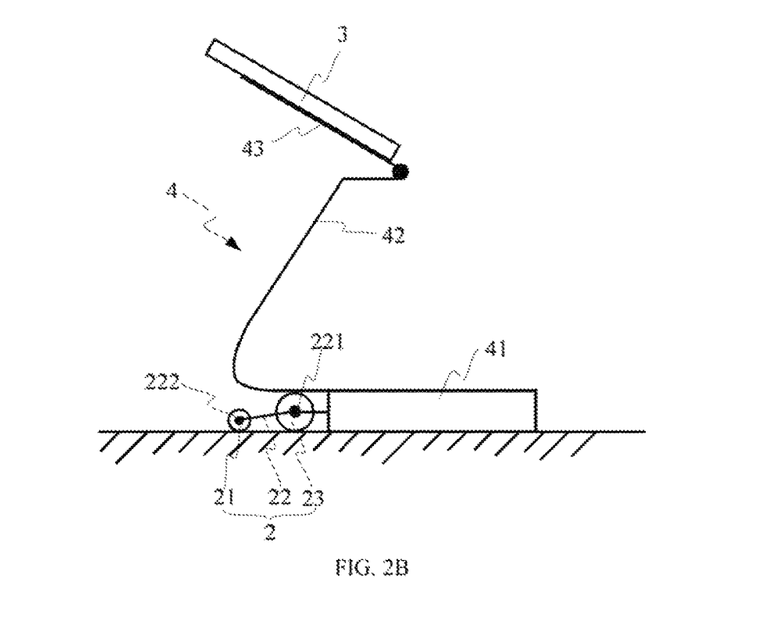
Figure 2C:
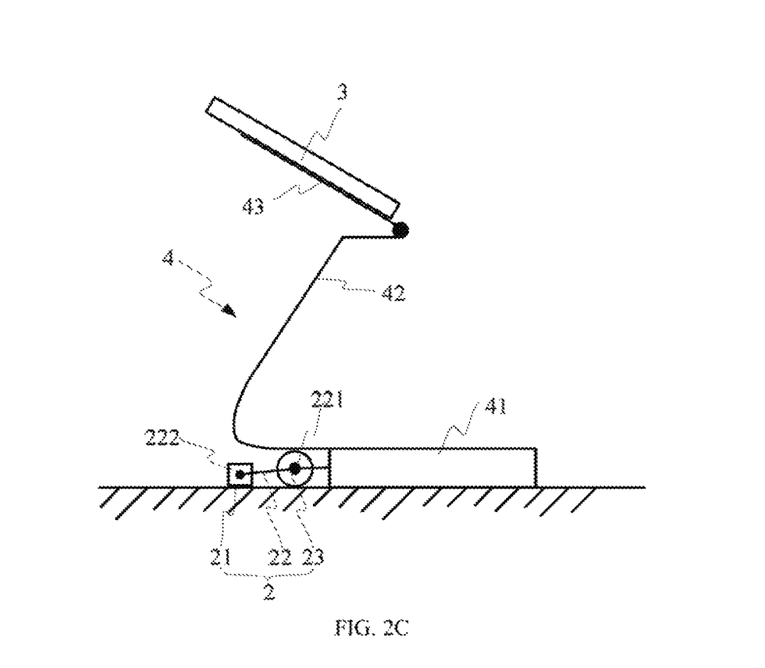

FIGS. 2A to 2C are schematic diagrams illustrating a structure for placing an object according to examples of the present disclosure.

As shown in FIG. 2A to 2C, the structure may include a stand 4 and a balancing structure 2.

In an example, the stand 4 may support the object 3 to stand on a plane, such as, a countertop or a desktop. The stand 4 may include a base 41, a support 42 and a clamping part 43.

The clamping part 43 may clamp and support the object 3. In an example, the object 3 may be an electronic device, or other types of devices having requirements for adjusting position.

In an example, the base 41 may be placed on a plane, serving as a pedestal of the stand 4. In an example, the base 41 may be an ordinary base. In another example, the stand 4 may be a docking station for an electronic device, and the base 41 may be a power supply base for providing power supply for charging the electronic device.

One end of the support 42 is fixedly connected with the base 41. In an example, the support 42 and the base 41 may be molded in one body. In another example, the support 42 may be fixedly mounted on the base 41. The other end of the support 42 is connected with the clamping part 43. In the example, the clamping part 43 may rotate around a connection point between the support 42 and the clamping part 43. By adjusting the tilt angle of the clamping part 43, the tilt angle of the object may be adjusted.

In an example, the balancing structure 2 may be installed on the base 41, to balance a tipping force of the base 41 suffered from an adjustment of the position of the object 3.

The installation positon of the balancing structure 2 may be designed according to force bearing status of the base 41. For example, when it is found out after testing that the adjustment of the position of the object 3 mainly generates the tipping force on the rear part of the base 41, the balancing structure 2 may be located at the rear of the base 41, to give a balance to the tipping force. In an example, the balancing structure 2 may be installed on the back side or installed on the bottom rear of the base 41. In an example, when it is found out after testing that the adjustment of the position of the object 3 mainly generates the tipping force on the front part of the base 41, the balancing structure 2 may be located at the front of the base 41. In an example, the balancing structure 2 may be installed on the front side or installed on the bottom front of the base 41. In an example, both the rear part and the front part of the base 41 may install a balancing structure 2. When the balancing structure 2 is installed on the bottom of the base 41, the balancing structure 2 may be covered by the housing (which is not shown in the figures) of the base 41, and not be exposed to the outside to provide a neat appearance for the stand 4.

In an example, the balancing structure 2 may include a crank balance part 21 and a crank body 22, as shown in FIG. 2A. In an example, it is the rear part of the base 41 receives the tipping force ("Uf") due to the adjustment of the position of the object 3, then the balancing structure 2 may be installed on the bottom rear of the base 41. The connection relationships and the functions of the crank balance part 21 and the crank body 22 are the same to that described accompanying with FIGS. 1A and 1B, no further descriptions will be provided here.

In another example, the balancing structure 2 may further include a wheel 23, as shown in FIGS. 2B and 2C. The connection relationships and the functions of the crank balance part 21, the crank body 22 and the wheel 23 are the same to that described accompanying with FIGS. 1C and 1D, no further descriptions will be provided here. Similar to FIGS. 1C and 1D, in FIGS. 2B and 2C, when the crank balance part 21 is rotated up to leave the plane, the structure can move to different positions. Namely, with the wheel 23, the smooth moving of the object 3 may be achieved.

In another example, the balancing structure 2 may further include an elastic element (which is not shown in FIGS. 2A to 2C). The elastic element includes a first end and a second end. The first end of the elastic element is connected to the base 41, and the second end of the elastic element is connected to the second end 222 of the crank body 22. The elastic element may apply a constant braking force (namely a downward pulling force) to the crank balance part 21, and then the crank balance part 21 may introduce an additional downward force. That is, the downward force ("Df") may further include an additional downward force besides the gravity of the crank balance part 21.

The elastic element may be a torsional spring, a compressed spring, shrapnel, a coil spring, or the like.

In examples of the present disclosure, the shape of the crank balance part 21 is not limited. In an example, the crank balance part 21 may be a balancing wheel, namely a small wheel, as shown in FIGS. 2A and 2B. In another example, the crank balance part 21 may be a balancing block, as shown in FIG. 2C. In other examples, the crank balance part 21 may be other shapes. When the crank balance part is a balancing wheel, the appearance of the plane (such as the countertop or the desktop) will not be scratched due to the surface of the wheel is smooth and without edges and corners.

In order to increase the force for attaching to the plane of the base of the structure, in an example, the crank balance part 21 may be covered by materials having preset friction coefficient, so that the force of the friction of the crank balance part 21 may be increased. The materials having preset friction coefficient may be rubber, silicone, and so on. In another example, the crank balance part 21 may be provided with a textured surface.

In addition, the shape of the crank body 22 is also not limited in examples of the present disclosure. For example, it may be straight or curved.

There are many connection methods between the wheel 23 and the base 41, for example, the connection methods between the wheel 23 and the base 41 may be the same as that described accompanying with the FIGS. 1E to 1G, no further descriptions will be provided here.

The number of balancing structure 2 may be one, two, three, four, and so on, and it is not limited by examples of the present disclosure.

In each balancing structure 2, the number of crank bodies 22 may be one, two, and so on, and it is not limited by examples of the present disclosure. In each balancing structure 2, the number of crank balance parts 21 may be one, two, and so on, and it is not limited by examples of the present disclosure. In each balancing structure 2, the number of wheels 23 may be one, two, and so on, and it is not limited by examples of the present disclosure.

Figure 3A:
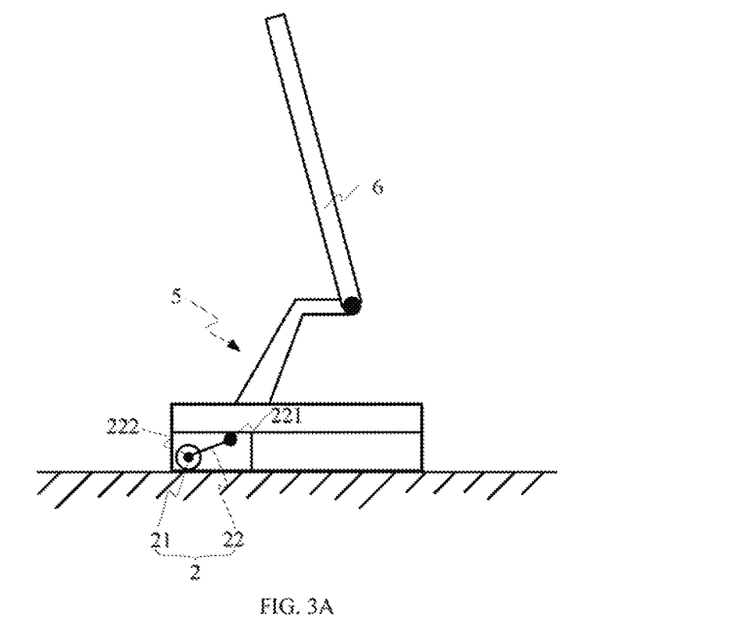
FIGS. 3A to 3C are schematic diagrams illustrating a display according to examples of the present disclosure.
Figure 3B:
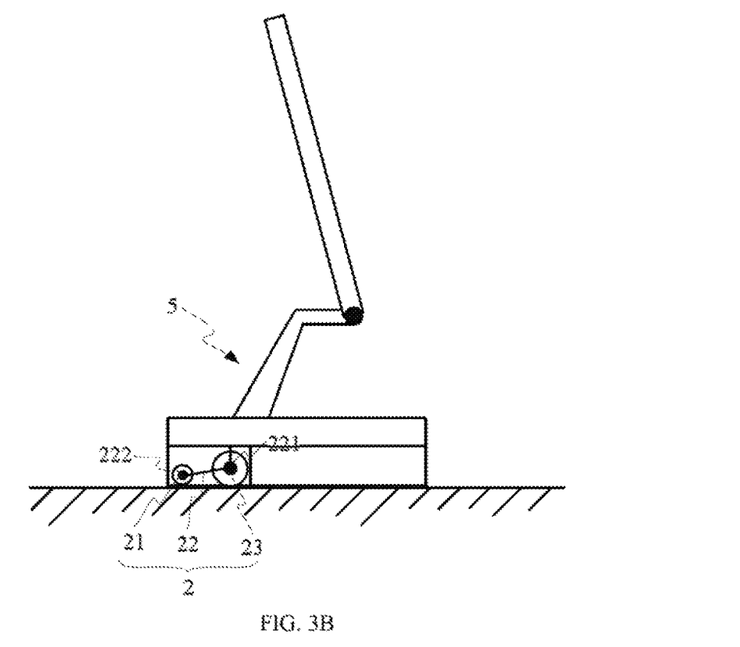
Figure 3C:
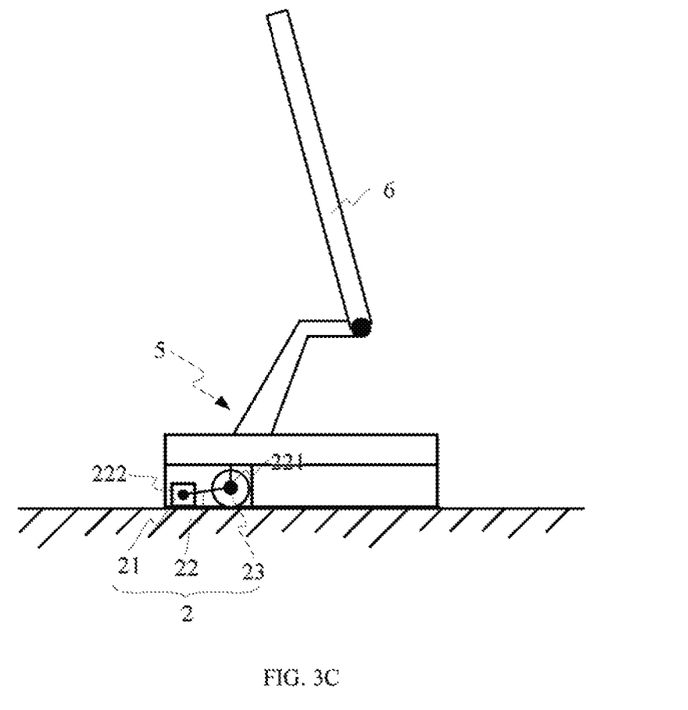

FIGS. 3A to 3C are schematic diagrams illustrating a display according to examples of the present disclosure.

As shown in FIG. 3A to 3C, the display may include a supporting base 5 and a balancing structure 2.

In an example, the supporting base 5 may support the display to stand on a plane, such as, a countertop or a desktop.

The balancing structure 2 may be installed on the supporting base 5, to balance a tipping force of the supporting base 5 suffered from an adjustment of the position of the display.

The installation position of the balancing structure 2 may be designed according to force bearing status of the supporting base 5. For example, when it is found out after testing that the adjustment of the position of the display mainly generates the tipping force on the rear part of the supporting base 5, the balancing structure 2 may be located at the rear of the supporting base 5, to give a balance to the tipping force. In an example, the balancing structure 2 may be installed on the back side or installed on the bottom rear of the supporting base 5. In an example, when it is found out after testing that the adjustment of the position of the display mainly generates the tipping force on the front part of the supporting base 5, the balancing structure 2 may be located at the front of the supporting base 5. In an example, the balancing structure 2 may be installed on the front side or installed on the bottom front of the supporting base 5. In an example, both the rear part and the front part of the supporting base 5 may install a balancing structure 2. When the balancing structure 2 is installed on the bottom of the supporting base 5, the balancing structure 2 may be covered by the housing (which is not shown in the figures) of the supporting base 5, and not be exposed to the outside to provide a neat appearance for the display.

In an example, the balancing structure 2 may include a crank balance part 21 and a crank body 22, as shown in FIG. 3A. In an example, it is the rear part of the base 41 receives the tipping force ("Uf") due to the adjustment of the position of the object 3, then the balancing structure 2 may be installed on the bottom rear of the supporting base 5. The connection relationships and the functions of the crank balance part 21 and the crank body 22 are the same to that described accompanying with FIGS. 1A and 1B, no further descriptions will be provided here.

In another example, the balancing structure 2 may further include a wheel 23, as shown in FIGS. 3B and 3C. The connection relationships and the functions of the crank balance part 21, the crank body 22 and the wheel 23 are the same to that described accompanying with FIGS. 1C and 1D, no further descriptions will be provided here. Similar to FIGS. 1C and 1D, in FIGS. 3B and 3C, when the crank balance part 21 is rotated up to leave the plane, the structure can move to different positions. Namely, with the wheel 23, the smooth moving of the object 3 may be achieved.

In another example, the balancing structure 2 may further include an elastic element (which is not shown in FIGS. 3A to 3C). The elastic element includes a first end and a second end. The first end of the elastic element is connected to the supporting base 5, and the second end of the elastic element is connected to the second end 222 of the crank body 22. The elastic element may apply a constant braking force (namely a downward pulling force) to the crank balance part 21, and then the crank balance part 21 may generate an additional downward force. That is, the downward force may further include an additional downward force besides the gravity of the crank balance part 21.

The elastic element may be a torsional spring, a compressed spring, shrapnel, a coil spring, or the like.

In examples of the present disclosure, the shape of the crank balance part 21 is not limited. In an example, the crank balance part 21 may be a balancing wheel, namely a small wheel, as shown in FIGS. 3A and 3B. In another example, the crank balance part 21 may be a balancing block, as shown in FIG. 3C. In other examples, the crank balance part 21 may be other shapes. When the crank balance part is a balancing wheel, the appearance of the plane (such as the countertop or the desktop) will not be scratched due to the surface of the wheel is smooth and without edges and corners.

In order to increase the force for attaching to the plane of the base of the structure, in an example, the crank balance part 21 may be covered by materials having preset friction coefficient, so that the force of the friction of the crank balance part 21 may be increased. The materials having preset friction coefficient may be rubber, silicone, and so on. In another example, the crank balance part 21 may be provided with a textured surface.

In addition, the shape of the crank body 22 is also not limited in examples of the present disclosure. For example, it may be straight or curved.

There are many connection methods between the wheel 23 and the supporting base 5, for example, the connection methods between the wheel 23 and the supporting base 5 may be the same as that described accompanying with the FIGS. 1E to 1G, no further descriptions will be provided here.

The number of balancing structure 2 may be one, two, three, four, and so on, and it is not limited by examples of the present disclosure.

In each balancing structure 2, the number of crank bodies 22 may be one, two, and so on, and it is not limited by examples of the present disclosure. In each balancing structure 2, the number of crank balance parts 21 may be one, two, and so on, and it is not limited by examples of the present disclosure. In each balancing structure 2, the number of wheels 23 may be one, two, and so on, and it is not limited by examples of the present disclosure.

The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the principles of the present disclosure and its practical applications, to thereby enable others skilled in the art to best utilize the present disclosure and various examples with various modifications as are suited to the particular use contemplated.

What is claimed is:

1. An apparatus comprising:
   a stand, to support an object to stand on a plane, and adjust a position of the object; and a balancing structure, installed on a base of the stand, to balance a tipping force of the base suffered from an adjustment of the position of the object, wherein the balancing structure comprises:

a crank balance part, to generate a downward force;

a crank body, to provide an eccentric arm of force for the downward force;

wherein the crank body comprises a first end and a second end; the first end of the crank body is connected to the base to enable the crank body to rotate around a connection point between the first end and the base, and the second end of the crank body is connected to the crank balance part; and a torque is produced by the crank balance part and the crank body to counteract the tipping force of the base.

2. The apparatus according claim 1, wherein the balancing structure is installed on a bottom side or a back side of the base.

3. The apparatus according to claim 1, wherein the balancing structure further comprises:

an elastic element comprising a first end and a second end;

wherein the first end of the elastic element is connected to the base, and the second end of the elastic element is connected to the second end of the crank body.

4. The structure according to claim 1, wherein the crank balance part is a balancing wheel.

5. The apparatus according to claim 4, wherein the balancing wheel is covered by materials having preset friction coefficient or is provided with a textured surface.

6. The structure according to claim 1, wherein the balancing structure further comprises:

a wheel, coaxially connected with the first end of the crank body, and to enable the base to move on the plane.

7. An apparatus comprising:

a stand, to support an object to stand on a plane, and adjust a position of the object; and a balancing structure, installed on a base of the stand, to balance a tipping force of the base suffered from an adjustment of the position of the object, wherein the balancing structure further comprises:

a crank balance part, to generate a downward force;

a crank body, to provide an eccentric arm of force for the downward force;

wherein the crank body comprises a first end and a second end; the first end of the crank body is connected to the base to enable the crank body to rotate around a connection point between the first end and the base, and the second end of the crank body is connected to the crank balance part;

a torque is produced by the crank balance part and the crank body to counteract the tipping force of the base;

a wheel, coaxially connected with the first end of the crank body, and to enable the base to move on the plane;

a first shaft, mounted on the base in a first direction;

a fork, connected with the first shaft and capable of revolving around an axis of the first shaft; and a second shaft, mounted on the fork in a second direction, wherein the second direction is vertical with the first direction;

wherein the wheel is mounted on the second shaft and capable of revolving around an axis of the second shaft.

8. The apparatus according to claim 6, wherein the balancing structure further comprises:

a connection shaft, mounted on the base, and to serve as an axle of the wheel for bearing rotation of the wheel.

9. An apparatus comprising:

a power supply base, to charge an electronic device;

a clamping part, to clamp the electronic device and adjust a tilt angle of the electronic device;

an arm, to adjust a height of the electronic device; wherein the arm comprises a first end and a second end, with the first end of the arm connected to the power supply base, and the second end of the arm connected to the clamping part; and a balancing structure, installed on the power supply base, to balance a tipping force of the power supply base generated by an adjustment of a tilt angle or height of the electronic device, wherein the balancing structure further comprises:

a crank balance part, to generate a downward force; and a crank body, to provide an eccentric arm of force for the downward force;

wherein the crank body comprises a first end and a second end; the first end of the crank body is connected to the power supply base to enable the crank body to rotate around a connection point between the first end and the base, and the second end of the crank body is connected to the crank balance part;

a torque is produced by the crank balance part and the crank body to counteract the tipping force of the base; and a wheel, coaxially connected with the first end of the crank body, and to enable the base to move on a plane.

10. An apparatus comprising:

a display body;

a supporting base, to support the display body to stand on a plane; and a balancing structure, installed on the supporting base, to balance a tipping force of the supporting base suffered from an adjustment of a position of the display body, wherein the balancing structure comprises:

a crank balance part, to generate a downward force; and a crank body, to provide an eccentric arm of force for the downward force;

wherein the crank body comprises a first end and a second end; the first end of the crank body is connected to the supporting base to enable the second end of the crank body to swing up and down along with the tipping force of the supporting base, and the second end of the crank body is connected to the crank balance part; and a torque is produced by the crank balance part and the crank body to counteract the tipping force of the supporting base.

11. The apparatus according to claim 10, wherein the balancing structure further comprises:

a wheel, coaxially connected with the first end of the crank body, and to enable the supporting base to move on the plane.

* * * * *

UNITED STATES PATENT AND TRADEMARK OFFICE
CERTIFICATE OF CORRECTION

PATENT NO. : 10,443,778 B2
APPLICATION NO. : 15/748966
DATED : October 15, 2019
INVENTOR(S) : Chern Shi Lam et al.

Page 1 of 1

It is certified that error appears in the above-identified patent and that said Letters Patent is hereby corrected as shown below:

In the Claims

In Column 9, Line 17 approx., Claim 2, delete "according claim" and insert -- according to claim --, therefor.

Signed and Sealed this
Fourteenth Day of January, 2020

Andrei Iancu
*Director of the United States Patent and Trademark Office*